SEMIPERMANENT MAGNETIC CORE STORAGE DEVICES

Filed Jan. 26, 1965 2 Sheets-Sheet 1

INVENTOR.
GERHARDUS B. VISSCHEDIJK
BY
Frank R. Trifari
AGENT

July 21, 1970 G. B. VISSCHEDIJK 3,521,248

SEMIPERMANENT MAGNETIC CORE STORAGE DEVICES

Filed Jan. 26, 1965 2 Sheets-Sheet 2

INVENTOR
GERHARDUS B. VISSCHEDIJK
BY
Frank R. Trifari
AGENT

1

3,521,248
SEMIPERMANENT MAGNETIC CORE STORAGE DEVICES

Gerhardus Bernardus Visschedijk, Hengelo, Netherlands, assignor to N.V. Hollandse Signaalapparaten, Hengelo, Netherlands, a firm of the Netherlands
Filed Jan. 26, 1965, Ser. No. 428,068
Claims priority, application Netherlands, Jan. 27, 1964, 6400600
Int. Cl. G11c *5/04, 17/00*
U.S. Cl. 340—174 9 Claims

ABSTRACT OF THE DISCLOSURE

A magnetic core storage matrix mounted in a resilient permeable layer and having a bar of magnetizable material above each row of a matrix. The bars have discreet magnetically polarized areas above selected cores in a row to prevent these selected cores from magnetically reversing their state.

This invention relates to magnetic storage devices and more particularly but not necessarily exclusively to magnetic storage devices arranged in the form of a matrix, said storage devices comprising cores of magnetizable material in which permanent information is stored by maintaining a strong flux through predetermined ones of said cores without the cooperation of currents flowing through the wiring of the storage device thereby preventing the generation of significant read-out voltages from these cores where currents are sent through the wires of the storage device.

In Belgian patent specification No. 627,326 there is described a matrix in which a small permanent magnet is located in closed proximity with a core which is to store permanently a certain type of bit. This magnet induces a sufficiently strong magnetic field in the core to prevent a current, flowing through a winding of the matrix, from significantly changing the magnetic flux in that core. Consequently, when the information in the matrix is read out, the core having a permanent magnet associated therewith will generate a much weaker read-out voltage pulse in the associated read-out wire than would be the case if the core had not been thus inactivated. The read-out system associated with the read-out wires of the matrix can therefore easily be adjusted to respond exclusively to pulses having a magnitude in excess of a predetermined threshold value which is higher than the voltages induced by a core having a permanent magnet associated therewith and lower than the voltages induced by a core not associated with such a permanent magnet. The reluctance of the magnetic circuit through which the flux of the permanent magnets passes is kept low by the provision of a path of high magnetic permeability near such cores, and in this case consisting of a soft iron frame plate.

The above described method of storing permanent information, which can be applied to various types of storage matrices, has several drawbacks. A storage matrix of normal dimensions must contain a large number of permanent magnets for storing fixed registrations. On the average one magnet is needed for each two cores. Consequently the cost of all the magnets needed in such a storage matrix is fairly high. Moreover, the size of the magnets is small, and in most forms of construction the total length of the air gaps in the magnetic circuits is fairly great, so that the magnets cannot sustain high fluxes for extended periods of time. Finally, no simple form of construction of this kind is as yet known in which a complete word or another coherent group of bits can be set in the storage one operation by placing one special accessory into the matrix. In the above referred to matrix, and in other similar matrices, each bit of each word must be individually set by the provision or omission of a magnet. Errors are easily made because each small magnet must be located at a particular point, for instance placed into a specific opening within a fairly small field containing many such openings.

The invention seeks to overcome these drawbacks by providing a magnetic storage device comprising a plurality of magnetic cores, a plurality of electrical conductors for setting, by means of current passed therethrough, one or more of said cores to a predetermined magnetic state, and resetting the said cores to generate a voltage pulse from each one of the reset cores with a magnitude exceeding a predetermined threshold value, and at least one bar consisting of permanent magnet material and arranged along and in close proximity with a group of cores, said bar being magnetized so as to provide a plurality of magnetic poles, each of which lies adjacent different predetermined ones of the cores in said group to induce a magnetic flux therein and thereby prevent those cores generating a voltage pulse having a magnitude in excess of said threshold value on the resetting of the cores in said group.

In those matrices referred to in the opening paragraphs of this specification many hundreds of magnets would be required for setting up a program of fixed registrations, whereas the device according to the present invention, when arranged in the form of a matrix, needs only one bar for each group in the matrix. Such a bar will be hereinafter referred to as a "magnet bar." These bars may have any direction with respect to the storage device; they may extend along any group of cores the shape of which is adapted to the shape of the bars. In a storage device arranged as a matrix it is, however, advantageous for the bars to be allotted to rows of cores because, as a rule, these rows register a word or at any rate a coherent group of bits, so that a bar arranged in this way can be applied to register such a word or such a coherent group. By mounting such a bar in the storage matrix the said word or group of bits is set in the storage device by means of one single manipulation. After having been used in the storage device for some time for the storage of a particular word the bar can be removed from the storage device in the magnetized state and kept. If a previously used word is to be set up anew, then the prepared and previously used bar again can be fitted to the storage device. This operation is quite simple and can be satisfactorily performed without trouble and errors.

It is desirable for the bars to be magnetised according to a fixed pattern, and for this reason it is important for the cores to be situated at well-defined, fixed points in the storage. In various embodiments of storage devices according to the invention the cores are for this purpose located in sockets in a supporting layer consisting of resilient material which is itself supported at the side away from the sockets by a rigid frame plate. The sockets do not extend through the entire thickness of the supporting layer, so that a thin layer of resilient material is present between a core in a socket and the rigid frame plate. Moreover, the parts of the cores which protrude from the sockets are located for at least the larger part in openings in a covering plate or covering layer which extends along the supporting layer. The wiring of the storage device is located between the two layers. This method for supporting the cores has the advantage of permitting the air gaps in the magnetic circuits for the fields that make cores inoperative to be reduced in length. As a result of the resiliency of the material of the supporting layer it is possible for the

2 magnet bars to be in contact with the cores without the risk of damaging or breaking them, for the cores can recede resiliently, when forces are exerted on them by the magnet bars, by compressing the material of the supporting layer situated between the bottom of the sockets containing the cores and the rigid frame plate. Preferably the material of the supporting layer comprises fine iron powder or fine powder of an iron compound with a high magnetic permeability in order to reduce the magnetic resistance for the flux passing through the cores. In a preferred embodiment of a storage device according to the invention in which the magnet bars are supported in a very efficient way, the covering layer is ribbed, a rib being situated between each pair of successive rows of openings for cores and also beyond the two outer rows of openings whilst the magnet bars are supported in the channels between two successive ribs. In this way the position of the magnet bars with respect to the cores is accurately defined.

In various embodiments of a storage device according to the invention, the poles of a magnet bar are arranged in pairs, the bar being magnetized between the poles of each pair so that the field lines pass more or less lengthwise through the bar between the two poles of such a pair. It may be that in a bar which is magnetized in this way the pairs of poles are separated and independent so that the flux flows from each pole to one other pole only, but it is also possible to arrange the pairs in such a way, that every pole belongs to two successive pairs and that the flux passing through a pole flows to or from two adjacent poles. The latter method is to be preferred because it permits the induction of stronger fields in the cores. In order that in a bar magnetized in this way the flux, supplied by an outer pole located opposite a core may find two poles through which it can flow back, it is indispensible for the bar to be provided near each of its ends with an extra pole not located opposite a core. In a bar in which the flux passing through a predetermined pole flows to or from one other pole, such an extra pole is only desirable if the number of cores to be made inoperative on a line is odd, for in this case the number of poles carried by the bar is also odd, so that there is one pole on the bar for which no second pole is available to send his flux to. In order that this pole may also dispose of a way back for its flux, one extra pole is arranged near said pole in an area not located opposite cores.

Methods for supporting the magnet bars in the storage device other than by means of ribs on the covering plate or layer have also been conceived. In another preferred embodiment a bar provided with a recess near each row of cores in which inoperative cores may be present is located along two oppositely situated edges of a storage device, the magnet bars being supported with their two ends in two such oppositely situated recesses. The magnet bars in this storage device may be magnetized in the same way as the magnet bars used in the storage device, in which the bars are supported by ribs on the supporting layer, but the magnet bars supported in recesses can also be magnetized in a direction transverse to their length.

It will be readily understood that closed circuits must be provided for the flux passing through the cores. The provision of these closed circuits does not constitute a serious problem in storage devices in which the magnet bars are magnetized lengthwise because then, apart from a few cases in which extra poles are required, the closed circuits are automatically present. If the bars are magnetized transverse to their length, special mesaures are required for this purpose. In a storage device arranged as a matrix storage with two cores per bit the cores to be made inoperative as well as two successive poles on the magnet bars will never be farther apart than a distance corresponding to thrice the distance between two successive cores. If in this case successive poles are magnetized with opposite polarities, the magnetic circuit for the flux flowing through an inoperative core can be closed through an adjacent inoperative core. If the number of bits is even, no further measures are required, but if the number of bits is odd it is highly desirable to provide one extra pole located in an area where there is no core in front of it, in order to provide a closed circuit for the flux passing through the adjacent pole opposite a core. Preferably a pole of the magnet bar situated opposite a core has a small cross section so that the field is centered on that core while the poles at the opposite side of the magnet bar have a large cross section in order that the circuits for the flux may be closed either in the overlapping part of the two poles in the interior of the magnet bar or with low field strength in the air beyond the bar. If the bars are magnetized transverse to their length, the reluctance of the closed circuits for the fields passing through the cores can be reduced by mounting a system with high magnetic permeability, such as a soft iron plate near the bars at the side away from the cores. Such a system is especially important in a storage device with one core per bit, because in such a storage device the distance between two inoperative cores and consequently the distance between two successive poles may be relatively large and at any rate larger than in a storage with two cores per bit. If a system with high magnetic permeability of the type described above is applied, the flux need not flow through the air at the side of the bars away from the core; it can pass through the said system with high magnetic permeability. Such a system with high magnetic permeability can be built in such a way that it locks the magnet bars in the storage.

Preferably the storage device according to the invention is also provided with a system with high magnetic permeability situated in the immediate vicinity of the cores at the side away from the magnet bars for the purpose of reducing the reluctance of the magnetic circuits. Such a system is well-known in the art and may be of the type described in the Belgian patent specification mentioned above and may consist of a soft iron frame plate. If such a storage is also provided with a system with high magnetic permeability described above and located at the side of the magnet bars away from the cores, then the distribution of the north and south poles on bars which are magnetized transverse to their length is no longer important, provided that at least one path with low reluctance extends between the two systems with high magnetic permeability. The fluxes passing through the cores can in this case always find a closed circuit passing through the said path, or paths with low reluctance.

It is obvious that it is not necessary for a storage system according to the invention to be provided with a supporting layer and a covering layer of the type described above. Any method or means suitable for fixing the cores in their places in the storage can be applied including the means described in the Belgian patent specification referred to above.

Preferred embodiments of the present invention will now be described in greater detail with reference to the accompanying drawings in which.

Figure 1:
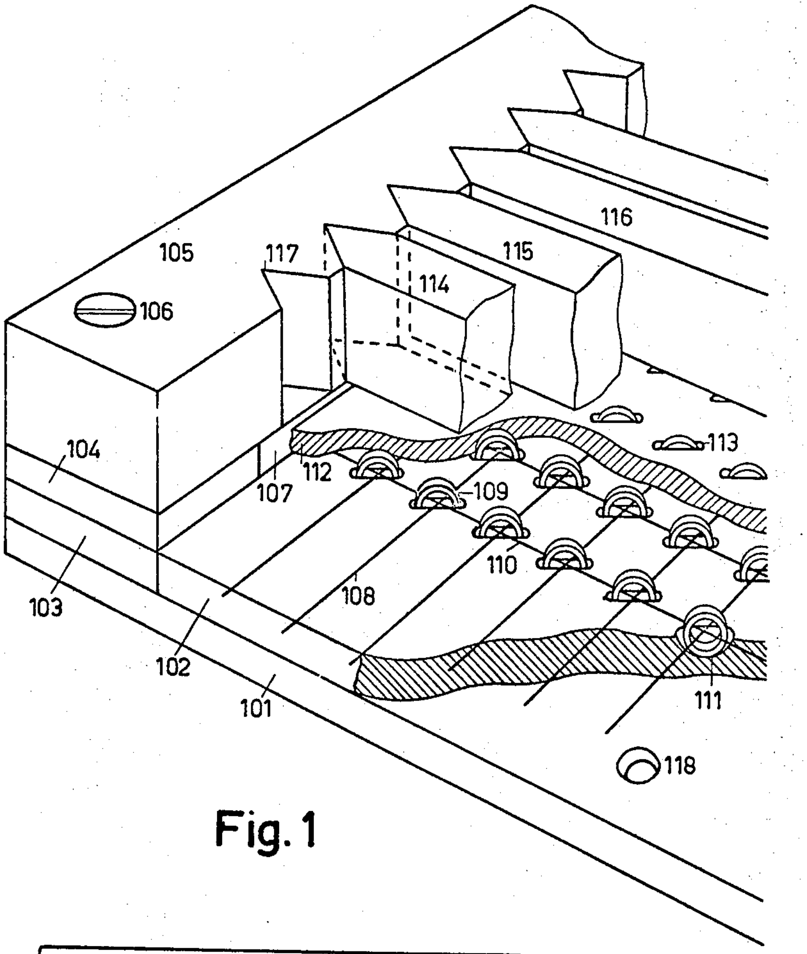
FIG. 1 shows a part of a storage matrix according to the invention.

FIG. 1 shows a part of a first preferred embodiment of a matrix storage according to the invention. In this figure, 101 is a soft iron frame plate. Two bars or ledges are mounted to this plate, one in the vicinty of each of two oppositely situated edges. One of these two ledges carries the reference 103. A supporting layer 102 consisting of an resilient plastics material, to which fine iron powder or powder of an iron compound with a high magnetic permeability is added, in order to decrease its magnetic resistance, is located between the two ledges mentioned above. This supporting layer is provided with recesses or sockets 111. The centers of the sockets 111 in the plane of the surface of layer 102 are located at the intersections of two relatively perpendicular sets of parallel lines which divide the surface of layer 102 into a pattern of adjacent rectangles. The wires of the matrix run approximately along these lines. A ring shaped core 109 is situated in each of the sockets. Consequently these cores are arranged in lines and columns. In the embodiment described a reading and writing wire such as 108, passing through the openings of all cores in a column is allotted to each column, while a selection wire such as 110, which passes through the openings of all cores in a line, is allotted to each line. Because the cores are situated in the sockets their position with respect to the layer 102 is fixed. Moreover, the layer 102 is precisely located on base plate 101 by projections on the underside of the layer engaging cylindrical openings 118 in base plate 101. The position of the cores in relation to the base plate and the storage is thus likewise precisely fixed. The direction of the axes of the cores in the sockets is, moreover, precisely defined by means of the covering plate or covering layer 112 which is shown partly removed and is provided with a pattern of openings 113 which corresponds to the pattern of sockets in the supporting layer 102. This covering layer is applied to the supporting layer is such a position that the parts of the cores which protrude from the supporting layer enter into the openings of the covering layer. In contradistinction to the sockets in the supporting layer the openings in the covering layer actually constitute passages. Moreover, the covering layer is thinner than the supporting layer so that the cores protrude slightly from the openings in the covering layer if it is in contact with the supporting layer. A tile-shaped block 104 rests on the ledge 103 near each corner of the rectangularly shaped frame plate, while a strip 107 of plastic extends between the two tile-shaped blocks located on the same ledge 103. The lower side of the said plastic strip is grooved in order to permit the selection wires to leave the matrix. A bar 105 of plastic material rests on the tile-shaped blocks and the strip 107 located on the same ledge 103; this bar 105 is connected by means of screws 106 to the rigid frame plate 101, and in this way fixes the ledge 103, the strips 107 and the tile-shaped blocks 104 to the plate. The bar 105 is provided with a wedge-shaped recess, such as 117, above each of the lines of the matrix. Two such oppositely situated wedge-shaped recesses are therefore present above each line and in these wedge-shaped recesses the ends of the magnet bars for setting words in the storage are located. The height of a magnet bar is the same as the thickness of the bar 105, so that their upper sides will be flush when the magnet bars rest on the strip 107. One of these magnet bars, in so far as it is situated within the area of the drawing, is indicated by the reference number 116. Two other bars 114 and 115 are shown partly broken off in order to leave the cores, the supporting layer and the covering layer visible. Because the positions of the cores are exactly defined by the sockets in the supporting layer and the openings in the covering layer it is possible for the wedge-shaped recesses to be located in such positions that a magnet bar located in these recesses is actually in the immediate vicinity of the cores of a line. The thickness of the ledge 103 and of the strip 107 is adapted in such a way to the dimensions of the supporting layer and of the cores that a magnet bar located in the wedge-shaped recesses and resting on the strip 107 just touches the cores of the corresponding line. This is possible without extreme accuracy in finishing the parts, because when forces are exerted on them by the bars, the cores can recede by compressing the resilient material of the supporting layer located between the bottom of their sockets and the frame plate 101. In order to prevent the magnet bars 115 from leaving the matrix these bars are locked by suitable means. In a preferred embodiment a strip extends along the bar 105 and over the wedge-shaped recesses, and is connected to the bar 105 by means of small screws. A similar strip locks the magnet bars near their other ends. In another preferred embodiment the complete matrix is closed at the side where the magnet bars are located by means of a lid, which is connected to the bars 105 by means of screws. The surface of the strips and the lid mentioned above in contact with the magnet bars may be covered with a thin layer of foam plastic so that the forces on the bars are exerted by the strips or the lid by resilient means.

The ways in which the magnet bars can be magnetized in preferred embodiments of the invention will now be described.

Figure 2:
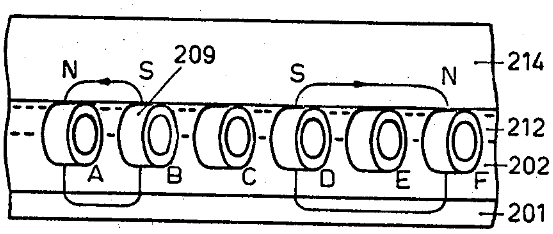
FIGS. 2, 3 and 4 show ways in which the magnet bars in storages according to the invention can be magnetized.
Figure 3:
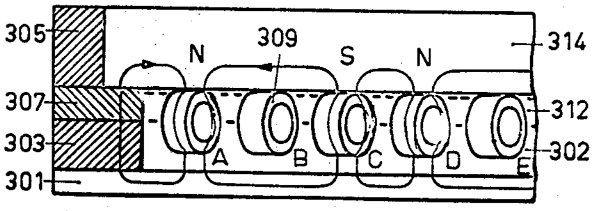

FIG. 2 shows a first way of magnetizing the magnet bars. In this figure 201 is the soft iron frame plate. The supporting layer 202 and the covering layer 212 are shown schematically. Part 214 is one of the magnet bars while 209 is one of the ring-shaped cores. A number of these cores designed by the letters A to F inclusive, are shown in the figure. It is assumed that the cores A, B, D and F are to be inoperative. In the first place the magnet bar 214 is then magnetized between points located opposite the cores A and B, so that it constitutes a small magnet between said two points. It is assumed in the figure that a north pole is located above the core A, while the south pole is located above the core B. Consequently the magnetic field flows from the north pole through the core A and the material of the supporting layer to which iron powder is added situated between the core and the frame plate, the soft iron frame plate 201, the resilient material of the supporting layer to which iron powder is added, situated below the core B and to the core B and from this core to the south pole above this core and back to the north pole through the magnet bar. The cores A and B are situated adjacently, but the same magnetizing method can be used if these cores are situated farther apart, although if the length of the part of the magnet bar 214 to be magnetized situated between the poles above the cores to be made inoperative becomes larger, a stronger field must be applied in order to magnetize the bar. At the right hand side of the figure an example is shown of a magnetization used to make two cores inoperative which are separated by a third one. For this purpose the magnet bar 214 carries a south pole above the core D and a north pole above the core F. It will be easily understood that the same method for magnetizing the bar can also be applied if more than one operative core is situated between two inoperative ones. FIG 3 shows another magnetizing method which permits the induction of stronger fields in the cores which are to be made inoperative. In this figure 301 is the soft iron frame plate while 302 and 312 are schematically shown, the supporting layer and the covering layer, 314 is a magnet bar and 309 a ring-shaped core, five of which, the cores A, B, C, D, E are shown. Part 305 is the cross section of a bar provided with wedge-shaped recesses and corresponding to the bar 105 in FIG. 1 while 307 and 303 are the cross sections of the strip and the ledge corresponding to the strip 107 and the ledge 103 shown in FIG. 1. It is assumed that the cores A, C and D are to be inoperative. For this purpose the magnet bar 314 is magnetized in such a way that north poles are located above the cores A and D while a south pole is located above the core C. In order to permit a higher flux to emanate from the poles, the magnet bar is magnetized from each pole in two opposite directions. Consequently, on the one hand, the bar is magnetized between the south pole above the core C in the direction to the north pole above the core D and on the other hand, from the south pole above the core C in the direction to the north pole above the core A. In this way flux is carried to or from a core from two sides, and the same strength of magnetization of the magnet bar will, therefore, result in a higher flux in the core. It will be readily understood that successive poles must have opposite polarity and that another pole of oppositely polarity must be present at either side of a pole located above a core to be made inoperative. Without special measures the latter condition cannot be fulfilled for each core. If no more cores to be made inoperative are present between a certain core which must be inoperative and the end of the row along which the magnet bar that makes said core inoperative is located only one pole would be available for carrying the flux to or from the said core. Consequently the said core would receive a lower flux than the other cores in the same row. In order to overcome this problem a magnet bar magnetized in this way is provided with an extra pole near each end, which pole is not located opposite a core and the polarity of which is opposite to that of the nearest pole situated opposite a core on the same line. A part of the flux flowing through the latter pole will then be closed through the said extra pole. Preferably the extra pole is located in a wedge-shaped recess of the rod 305 above the strip 307. The magnetic flux emanating from the said extra pole will then flow through the ledge 303, which in this case preferably consists of a soft iron, while if desired, the strip 307 may consist of a plastics material containing iron powder.

When using the magnetizing method shown in FIG. 2 it may also be necessary to apply such extra poles. When using this method the cores are made inoperative in pairs. Nevetheless the number of cores to be made inoperative in a line may be odd. This number will certainly be odd when in a matrix with two cores per bit an odd number of bits is registered in a line. Moreover the number of cores to be made inoperative may be odd in a matrix with one core per bit because then the number of bits in a word requiring the corresponding core to be inoperative is not constant but depends on the word to be registered. If, for any one of the reasons mentioned above, the number of cores to be made inoperative and, consequently, the number of poles on the magnet bar, is odd, the magnet bar magnetized according to FIG. 2 is provided with an extra pole which makes the number of poles even.

Figure 4:
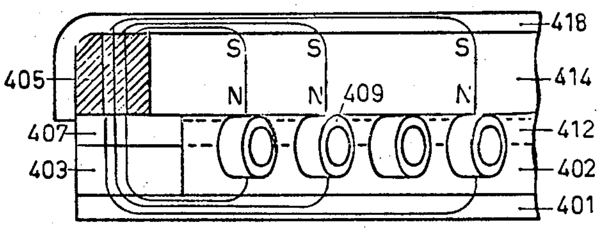

FIG. 4 shows a third way of magnetising the magnet bars. In this figure, 401 is the soft iron frame plate, 402 a schematic representation of the supporting layer and 412 a schematic representation of the covering layer, 409 is a ring-shaped core and 414 a magnet bar, the left side of which is supported on a strip 407 in a wedge-shaped recess in a bar 405 and the right side of which is supported in a similar way. The magnet bars 414 are locked below a soft iron lid 418 which is provided with flanged edges that reach around the bars 405 situated at either side. In this case the ledges 403 are made of soft iron while each of the strips 407 consists either of a plastic to which iron powder is added or of soft iron, although in the latter case it is expensive to provide them with grooves through which the selection wires can leave the matrix. Furthermore, in this construction the bar 405 consists of soft iron. In the matrix shown, all the poles located above inoperative cores are north poles, while each magnet bar is magnetized between its lower and its upper side, so that the south pole corresponding to such a north pole in the figure is situated above the said north pole on the upper side of the magnet bar. The flux supplied by such a north pole flows through the core situated below said north pole through the thin layer of plastic, to which iron powder is added, constituting the bottom of the socket in which the core is located, then through the soft iron frame plate to at least one of the edges of the matrix and from there through a soft iron ledge 403, a strip 407 and a bar 405 to the soft iron lid 418, and through this lid to the north pole situated above and generated together with the north pole from which the flux emanated and through the magnet bar 414 back to the said north pole. In a storage device in which the bars are magnetized in this way it is not necessary for the poles to have the same polarity. The flux passing through the ledges near the edges of the storage may be reduced substantially if the poles have different polarity. If the number of north poles is equal to the number of south poles, then in principle the flux may flow back completely through the lid 418, no flux passing through the bar 405. In this case, and also if, on a line with many inoperative cores, the difference between the number of north poles and south poles is small, no path with low reluctance is required between the two systems with high magnetic permeability consisting of the lid and the frame plate. In a storage matrix with two cores per bit, lines with many cores and magnet bars located along the lines, the paths with low reluctance between lid and frame plate are always superfluous, for the number of cores to be made inoperative (always half of the cores on a line) is then large while with a suitable distribution of the polarities the difference between the numbers of north and south poles will never be more than one.

Figure 6:
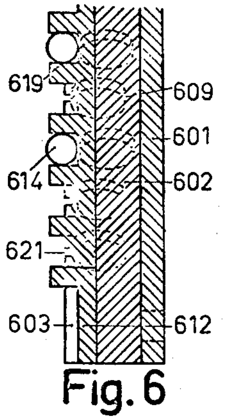
FIGS. 5, 6 and 7 show three views from different directions of another embodiment of a storage matrix according to the invention.
Figure 5:
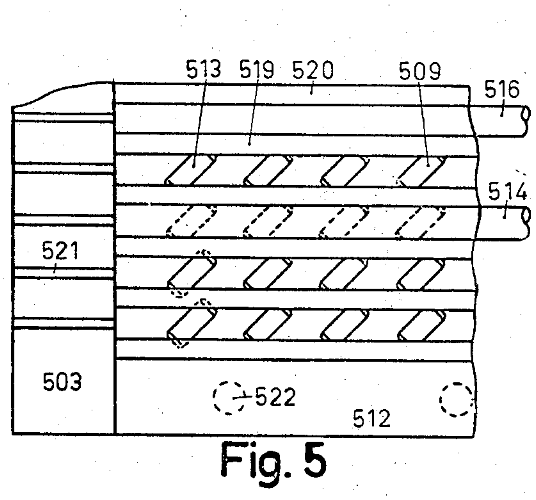
Figure 7:
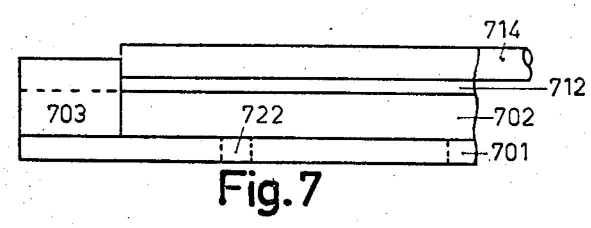

The FIGS. 5, 6 and 7 show a very effective and simple embodiment of a matrix storage according to the invention. In this figure the first figure in a reference is the same as the number of the figure in which it is present, while the last two figures in the reference are the same for parts present in various figures. Part 601, 701 is a soft iron frame plate in contact with a supporting layer 602, 702. This supporting layer consists of plastic material to which iron powder is added, and is provided with sockets for the ring-shaped cores 509, 609, 513 similar to those in the supporting layer shown in FIG. 1. Moreover, the supporting layer 602 carries projections 522, 722, engaging cylindrical openings in the frame plate, so that the supporting layer is fixed to the frame plate. Reading and writing wires as well as selection wires are carried through the cores 509, 609 in the way that is usual in matrix storages. A covering layer 512, 612, 712 consisting of resilient material is mounted to the supporting layer and covers the various conductors passing through the cores. This covering layer is provided with a pattern of openings that corresponds to the pattern of sockets in the supporting layer. Preferably the cores exactly fit in the sockets in the supporting layer as well as in the openings of the covering layer, in this way connecting supporting layer and covering layer so that no special measures are required for fixing the covering layer to the matrix storage. At either side of the matrix strips consisting of plastic material are carried along the covering and supporting layers. These strips are fixed to the frame plate 601, for instance by means of screws or by means of glue. These strips reach just above the surface of the covering plate or layer and are provided with grooves such as 521, 621, through which the conductors belonging to one of the sets of conductors of the matrix leave the storage. Furthermore, the said covering layer is provided with a rib between each pair of successive openings for cores as well as beyond each of the outer rows of openings. In order to keep the dimensions of the matrix storage as small as possible the openings will be partly situated below the said ribs, but, nevertheless, cores resting on the bottom of their sockets in the supporting layer 602 will protrude slightly into the channels between the ribs if they are not subjected to forces. In each channel corresponding to a row of cores, in which at least one core must be inoperative, a magnet rod such as 514, 614, 714, 516 is located. Such a magnet rod consists of magnetic material with high coercive force suitable for making permanent magnets. These magnet rods are provided with a magnetic pole above each of the cores which are to be inoperative and this pole induces a field in the said core which prevents this core from generating induction voltages worth mentioning in a reading wire passing through the opening of said core. These magnet rods are preferably magnetized in the way shown in FIG. 1 or in the way shown in FIG. 3. Their length is such that they fit exactly between the strips, such as 503.

Consequently the position of such a rod in the matrix is exactly defined, and this position is such that poles generated in predetermined points of the rod are actually situated above cores. Preferably the pole surfaces embrace the rods like rings, so that a rod can be mounted in the matrix, in any position measured around its longitudinal axis.

If the friction of the cores in the sockets of the supporting layer and in the openings of the covering layer is insufficient for keeping the covering layer in its correct position with respect to the storage device then the covering layer may be clamped under metal strips that are mounted to the frame plate by means of small screws or similar means and are located near those edges of the storage device that are perpendicular to the strips 503. In another effective embodiment of this matrix no strips 503 are provided while the two layers cover the frame plate completely and are clamped under a light metal frame which is connected to the frame plate by means of screws. The parts of this frame that are perpendicular to the ribs are flanger, in order to provide stops for the magnet bars, the positions of which are thus accurately defined. No special measures are taken in the various embodiments with a ribbed covering plate or layer for the purpose of maintaining the magnet bars in the channels between the ribs. The friction of the bars in these channels is, as a rule, sufficient for keeping these bars in their correct positions. If desired the magnet bars can be locked under a lid or under strips. These locking means are, however, to be made from a material with high magnetic resistance in order to prevent them from establishing magnetic short circuits between the poles of the magnet bars and carrying the flux away from the cores. A lid for instance would have to be made from a non-ferro magnetic material.

It will be readily understood, that other embodiments of the invention may be conceived.

The magnet bars are magnetized by means of electro magnets, which are excited either by a condensor discharge or by a constant direct current. If necessary, the strength of this excitation is adapted to the distance between the poles to be induced. If a distribution of poles as shown in FIG. 2 or FIG. 3 is to be established, either magnets with different pole distances or a magnet with an adjustable pole distance may be applied. In order to magnetize a magnet bar with a pole distribution, as shown in FIG. 4, one single magnet can be used, which can just span the bar in a direction transverse to its length. In order to obtain the required configuration of poles, the bar is preferably magnetized in an arrangement in which it can be shifted lengthwise along a straight guide and can be adjusted in various positions with respect to the magnet or magnets which are to induce the poles by means of an adjustable stop, a rack or a screw spindle.

In an effective embodiment of a magnetizing device the magnet bar is clamped in a well-defined position onto a sledge which can be shifted rectilinearly by means of a screw spindle. When shifted in this way the bar is displaced with respect to the position where the magnet poles can be applied to the bar. The storage device according to the invention need not be a storage matrix, that is, a storage device in which the cores and the wiring are arranged in matrix shape. If in the above specification and in the claims below the expression "row" or "line" of cores is used, this expression should not be mistaken for a line or row of cores in a storage matrix in which the cores are coupled magnetically to the same conductor. A row or line of cores in a storage device according to the invention is a group of cores which is adapted to the, as a rule straight, shape of the magnet bars, so that a magnet bar may be arranged along such as group. The cores in such a row or line need not be coupled magnetically to the same conductor and need not register a word. If the invention is applied to a storage matrix, it is, as a rule, advantageous, to arrange the magnet bars along a row of cores coupled to the same conductor, for not only are these cores arranged on a straight line, but moreover, as a rule, they also register a group of coherent bits, which in many cases will be changed simultaneously.

What we claim is:

1. A magnetic storage device comprising a plurality of cores of magnetizable material arranged in rows and columns, a read-wire magnetically coupled to at least one of said cores, means for setting each said core to a first magnetic state, means for reversing the magnetic state of each said core thereby to generate a voltage in said read-wire exceeding a predetermined threshold value, and a bar of permanent magnet material arranged in close proximity with a row of cores, said bar having magnetically discrete magnetized areas adjacent selected cores, thereby to prevent said selected cores from generating a voltage having a magnitude greater than said threshold value in said read-wire upon actuation of said reversing means.

2. A magnetic storage device comprising a plurality of cores of magnetizable material arranged in rows and columns, a read-wire magnetically coupled to at least one of said cores, means for setting each said core to a first magnetic state, means for reversing the magnetic state of each said core thereby to generate a voltage in said read-wire exceeding a predetermined threshold value, a magnetically permeable layer on one side of said core matrix and having sockets partially receiving said cores, means for supporting said layer, a bar of magnetizable material having magnetically discrete magnetized areas along the length thereof, and means for supporting said bar in close proximity to a row of cores in said matrix with said magnetized areas of said bar secured in confronting relationship to selected cores in said row, thereby to prevent a change in the magnetic state of a selected core upon actuation of said reversing means.

3. A magnetic storage device as clamide in claim 1 wherein said means for supporting said magnetically permeable layer comprises a rigid magnetically permeable frame plate abutting said layer on a side opposite said core.

4. Apparatus as claimed in claim 2 further comprising a cover plate intermediate said magnetically permeable layer and said bar and having slots receiving said cores.

5. Apparatus as claimed in claim 4 further comprising a pair of ribs on said cover plate facing outward from said row of cores and partially receiving said magnetizable bar.

6. Apparatus as claimed in claim 2 wherein said means for supporting said bar comprises a frame bar transverse to said magnetizable bar and having a notched portion abutting an end of said magnetizable bar.

7. Apparatus as claimed in claim 2 wherein said areas in said bar are magnetized transverse to the major dimension of the bar.

8. Apparatus as claimed in claim 2 wherein said areas along said bar are magnetized with successive opposite magnetic polarities.

9. Apparatus as claimed in claim 2 wherein said areas along said bar are magnetized with an alternate sequence of poles.

References Cited

UNITED STATES PATENTS

| | | | |
|---|---|---|---|
| 2,934,748 | 4/1960 | Steimen | 340—174 |
| 3,140,403 | 7/1964 | Mörwald | 340—174 |
| 3,196,522 | 7/1965 | Bernstein et al. | 340—174 |
| 3,263,221 | 7/1966 | Van Der Hoek | 340—174 |

STANLEY M. URYNOWICZ, Jr., Primary Examiner